US 8,540,950 B2

(12) United States Patent
Ruonala et al.

(10) Patent No.: US 8,540,950 B2
(45) Date of Patent: Sep. 24, 2013

(54) METHOD FOR THE REMOVAL OF CHLORIDE FROM ZINC SULPHATE SOLUTION

(75) Inventors: Mikko Ruonala, Kantvik (FI); Kurt Svens, Espoo (FI); Antti Arpalahti, Vuokatti (FI); Karoliina Lepistö, Espoo (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/511,091

(22) PCT Filed: Nov. 22, 2010

(86) PCT No.: PCT/FI2010/050946
§ 371 (c)(1),
(2), (4) Date: May 21, 2012

(87) PCT Pub. No.: WO2011/061408
PCT Pub. Date: May 26, 2011

(65) Prior Publication Data
US 2012/0288424 A1 Nov. 15, 2012

(30) Foreign Application Priority Data

Nov. 23, 2009 (FI) .................................. 20090441

(51) Int. Cl.
*C01G 3/00* (2006.01)
(52) U.S. Cl.
USPC .................. 423/43; 423/45; 423/46; 423/493; 423/544; 75/740

(58) Field of Classification Search
USPC .................. 423/43, 45, 46, 493, 544; 75/740
See application file for complete search history.

(56) References Cited

U.S. PATENT DOCUMENTS

| 4,005,174 A | 1/1977 | Bodson |
| 7,682,581 B2 | 3/2010 | Lehinen et al. |
| 2007/0048203 A1 | 3/2007 | Lehtinen |

FOREIGN PATENT DOCUMENTS

| CN | 101285119 A | 10/2008 |
| FI | 20031615 A | 5/2005 |
| JP | 54-001679 B2 | 1/1979 |
| JP | 2005-144374 A | 6/2005 |
| JP | 3762047 B2 | 3/2006 |
| JP | 2009-179841 A | 8/2009 |
| JP | 4765062 B2 | 9/2011 |
| WO | WO 2005/045078 A1 | 5/2005 |

OTHER PUBLICATIONS

International Search Report (PCT/ISA/210) issued on Mar. 17, 2011, by the Finnish Patent Office as the International Searching Authority for International Application No. PCT/FI2010/050946.
Written Opinion (PCT/ISA/237) issued on Mar. 17, 2011, by the Finnish, by the Japanese Patent Office as the International Searching Authority for International Application No. PCT/FI2010/050946.
English Translation of an Office Action dated May 30, 2013 issued in corresponding Japanese Application No. 2012-539376.

*Primary Examiner* — Steven Bos
(74) *Attorney, Agent, or Firm* — Buchanan Ingersoll & Rooney PC

(57) ABSTRACT

The invention relates to a method for removing chloride from zinc sulphate solution in conjunction with zinc production. According to the method, the chloride is removed from solution by means of monovalent copper, which is produced in a separate copper(I) oxide formation stage, in which the pH is regulated to the region of 4.5-5.

6 Claims, 1 Drawing Sheet

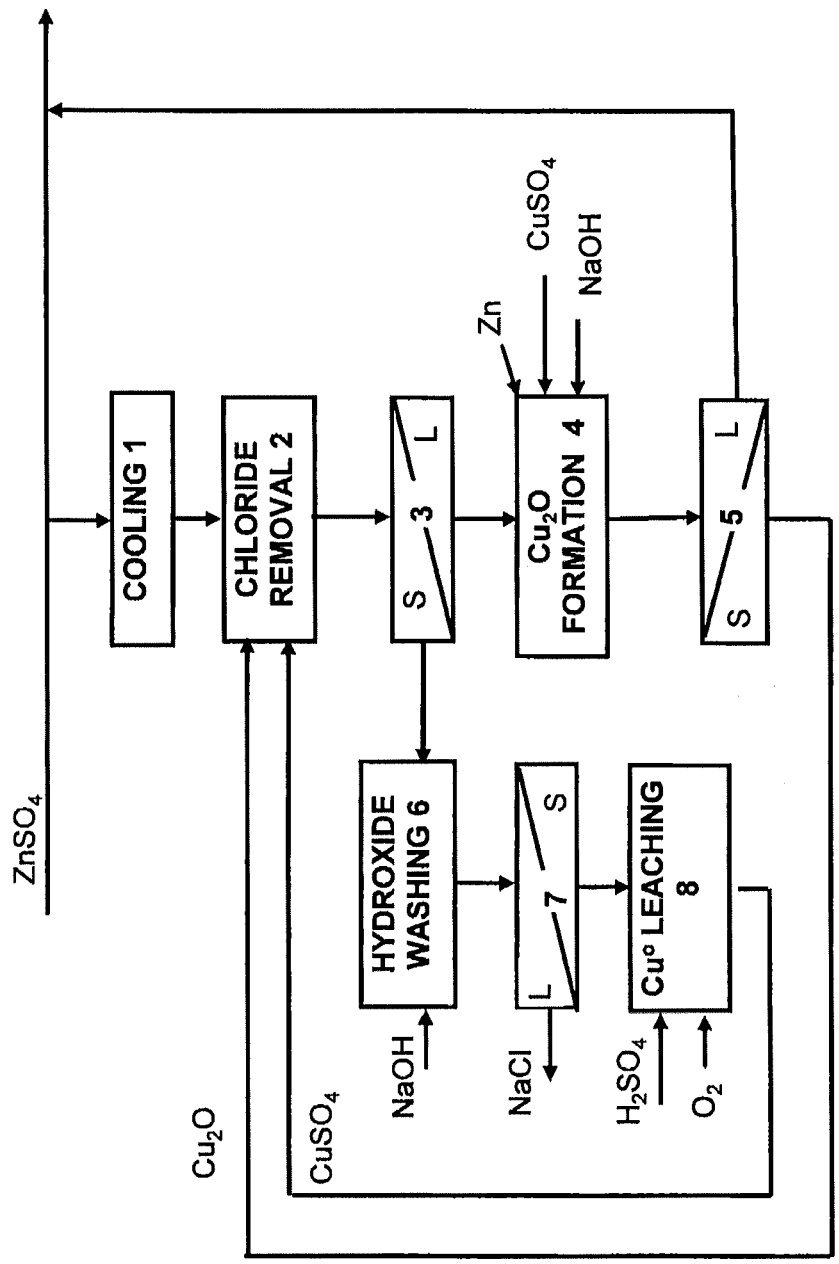

METHOD FOR THE REMOVAL OF CHLORIDE FROM ZINC SULPHATE SOLUTION

FIELD OF THE INVENTION

The invention relates to a method for removing chloride from zinc sulphate solution in conjunction with zinc production. According to the method, the chloride is removed from solution by means of monovalent copper, which is produced in a separate copper(I) oxide formation stage, in which the pH is regulated to the region of 4.5-5.

BACKGROUND OF THE INVENTION

The recovery of zinc from zinc sulphate solution usually takes place electrolytically. Chloride is a fairly harmful substance in zinc electrolysis, since it corrodes the cathode surfaces so that problems are caused when peeling the zinc plate away from the cathode.

U.S. Pat. No. 4,005,174 is known in the prior art, which describes the removal of chloride from a solution that has been obtained by leaching the slag generated in galvanisation into a solution of sulphuric acid. The amount of sulphuric acid in the solution is adjusted so that the pH of the solution is always below 2.6. Chloride removal is performed using copper(I) oxide ($Cu_2O$). Three ways of forming copper(I) oxide in zinc sulphate solution are presented in the publication and all removal methods are presented by means of one process flowsheet. According to the first alternative, copper sulphate and zinc powder are added to the chloride removal stage, reacting to form cuprous oxide, which then reacts further with chloride to form copper chloride, which is precipitated from the solution. According to the second method, copper sulphate and metallic copper powder are added to the solution, and as a result of the reaction between them, monovalent copper is also generated. According to the third alternative, copper(I) oxide is added to the solution, which reacts with chloride. All these alternatives carry the condition that after chloride removal at least 0.5 g/l of copper sulphate should remain in the solution. The chloride is washed from the copper chloride residue by means of sodium hydroxide, the sodium chloride solution that is formed is removed and the copper(I) oxide generated is fed back to chloride removal. The excess copper in the zinc sulphate solution that is present after chloride removal is removed by cementing it with zinc powder, and the metallic copper obtained is oxidised by means of sulphuric acid and air into copper sulphate, which is fed back to the chloride removal stage.

It has been found in practice, that feeding copper(I) oxide directly into the chloride removal stage is the fastest way to remove chloride from a solution, because when feeding copper sulphate and zinc powder into a zinc sulphate solution, generally the reaction in which copper is reduced to metallic copper occurs first and only then is it oxidised into oxide. The generation of copper(I) oxide in zinc sulphate solution in the method accordant with U.S. Pat. No. 4,005,174 is probably fairly slow, because the pH of the solution is specified to be below 2.6, which is too low for effective formation of copper (I) oxide. It has also been found that in addition to copper(I) oxide being formed in the chloride washing subsequent to chloride removal, metallic copper is also formed, which remains circulating in the process unless it is leached and removed.

A method according to FI patent publication 117 246 is also known in the prior art, which describes both chloride removal by means of copper(I) oxide and copper removal by ion exchange from concentrated zinc sulphate solution. The method is particularly suitable for raw solutions that have a copper concentration high enough for the copper contained in the solution can be used for the fabrication of copper(I) oxide used to remove chloride from the solution. The use of the copper in the raw solution is optimised further by recycling.

PURPOSE OF THE INVENTION

The purpose of the method now developed is to remove chloride from concentrated zinc sulphate solution by means of copper(I) oxide, particularly in the case where the amount of copper in the zinc sulphate solution to be purified is so low that alone it is insufficient for chloride removal. In the method accordant with the invention, the process steps are set up so that the fastest chloride removal possible is achieved, occurring with the smallest possible recycling of copper between the various process stages.

SUMMARY OF THE INVENTION

The essential features of the invention will be made apparent in the attached claims.

The invention relates to a method for removing chloride from concentrated zinc sulphate solution by means of copper (I) oxide, whereby a sidestream is taken from the zinc sulphate solution, which is cooled and routed to a chloride removal stage. Chloride removal is performed by means of copper(I) oxide ($Cu_2O$), which is produced in a separate copper(I) oxide formation stage by reducing the copper sulphate contained in the zinc sulphate solution fed into the stage and additionally the copper sulphate fed into the stage to copper(I) oxide by means of zinc powder in a pH range of 4.5-5.

It is typical of the method accordant with the invention that the solution exiting the chloride removal stage is subjected to liquid/solids separation and that the copper chloride residue formed is routed to hydroxide washing in order to form sodium chloride solution and a precipitate containing copper (I) oxide and metallic copper.

It is also typical of the method accordant with the invention that the precipitate exiting hydroxide washing is leached in the copper leaching stage with sulphuric acid and oxygen-containing gas and that the acidic copper sulphate solution formed is routed to the chloride removal stage.

According to one embodiment of the invention, part of the copper sulphate formed in the copper leaching stage is routed to the copper(I) oxide formation stage.

According to another embodiment of the invention, part of the precipitate exiting hydroxide washing is routed to the copper(I) oxide formation stage.

According to a further embodiment of the invention, the pH of the copper(I) oxide formation stage is regulated by means of sodium hydroxide.

LIST OF DRAWINGS

FIG. 1 is a flowsheet of the method accordant with the invention.

DETAILED DESCRIPTION OF THE INVENTION

The invention relates particularly to a method for removing chloride from concentrated zinc sulphate solution, in which the copper concentration of the zinc sulphate solution to be processed is so low that it is not sufficient to be used for removing chloride from the solution to a level low enough to meet the demands of electrolysis. The term concentrated zinc sulphate solution, or raw solution, is used here to mean a solution in which the amount of zinc is in the region of 30-200 g/l.

In accordance with the method, a part of the impure zinc sulphate solution is routed to a sidestream for chloride removal. The solution taken into the sidestream is routed to a cooling stage 1, in which it is cooled to a temperature that is a maximum of 45° C. As a result of cooling, gypsum is also crystallised out of solution and can be recycled to a suitable point in the process or removed from the circuit. The cooled solution is routed to a chloride removal stage 2, where copper (I) oxide precipitate produced in a separate copper(I) oxide formation stage 4 is fed into the solution. The precipitate may also contain metallic copper. Chloride removal is performed in a pH range of 1.5-3.9. The chloride in the solution reacts with the copper(I) oxide fed into it and forms copper chloride CuCl, which is precipitated. Liquid/solids separation 3 is performed on the solution to remove the copper chloride.

The solution from which copper chloride has been removed still contains some divalent copper $Cu^{2+}$, the amount of which depends on the level to which chloride removal is implemented. The amount of copper is usually around 800-1200 mg/l. The majority of this copper too is removed from the solution before it is routed back to the main stream of zinc sulphate solution. The removal of divalent copper occurs in the same stage 4 as the formation of all the copper(I) oxide required in the method. In this stage, the divalent copper in solution is precipitated by means of zinc powder, so that both metallic copper and copper(I) oxide are formed in the reactions. The entire amount of copper required, which is needed in chloride removal in addition to the copper in the circuit, is fed into this copper(I) oxide formation stage 4 in the form of copper sulphate i.e. divalent copper. Additionally, the equivalent amount of zinc powder to that of copper fed into the stage is routed to the stage in order to cement and precipitate the copper. Sodium hydroxide or some other suitable base is also fed into the stage to regulate the pH to the region of 4.4-5.2, at which the reactions proceed more quickly. The following reactions among others take place in the precipitation stage:

$$CuSO_4 + Zn^° \rightarrow ZnSO_4 + Cu^° \quad (1)$$

$$CuSO_4 + Cu^° + H_2O \rightarrow Cu_2O + H_2SO_4 \quad (2)$$

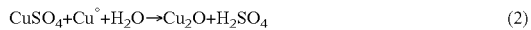

$$2\, CuSO_4 + Zn^° + H_2O \rightarrow Cu_2O + ZnSO_4 + H_2SO_4 \quad (3)$$

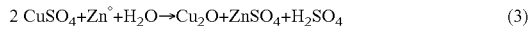

The solids generated in the copper(I) oxide formation stage 4 are separated from the solution in liquid/solids separation 5 and routed to the chloride removal stage 2. After chloride removal and copper removal, the zinc sulphate solution is routed back to the main stream.

The copper chloride residue generated in the chloride removal stage 2 is routed to the hydroxide washing stage 6, in which the hydroxide is preferably sodium hydroxide. Washing is performed preferably in a pH range of 8-10, and the sodium chloride solution formed is routed to water treatment after liquid/solids separation 7. The precipitate formed in washing mostly contains copper(I) oxide and some degree of metallic copper formed in the copper(I) oxide formation stage 4. It is advantageous to oxidise the precipitate in the copper leaching stage 8 into copper sulphate by means of sulphuric acid and oxygen-containing gas, and it is advantageous to recycle the acidic copper sulphate solution that is formed to chloride removal stage 2, which should always also include the amount of divalent copper described above. The recycled copper sulphate solution also enables the pH value of the chloride removal stage to be adjusted to a suitable level for chloride precipitation. Leaching of the copper chloride residue takes place at a pH range of 0-2. The second alternative is that not all of the precipitate exiting the hydroxide washing stage is leached but is at least partially routed to the copper(I) oxide formation stage 4, so that the amount of zinc powder used for copper(I) oxide formation can be optimised. Likewise, part of the copper sulphate formed can also be fed to the copper(I) oxide formation stage 4, so that it reacts with metallic copper to form copper(I) oxide while simultaneously optimising the amount of zinc powder used.

EXAMPLES

Example 1

Chloride concentration in zinc electrowinning is generally regarded to be a maximum of 250 mg/l. If the zinc sulphate solution exiting leaching does not contain sufficient copper in the form of dissolved copper sulphate, it has to be added. There follows a balance calculation, describing the chloride removal stage:

| | |
|---|---|
| Chloride entering chloride removal stage in $ZnSO_4$ solution | 71.2 kg/h $Cl^-$ |
| Amount entering subsequent purification stage (198 m³/h, specified chloride concentration 213 mg $Cl^-$/l) | 42.2 kg/h $Cl^-$ |
| Amount to be removed | 30.0 kg/h $Cl^-$ |
| Amount required for precipitation (kg/h) = 30 * 143.08 kg/kmol ($Cu_2O$)/2 * 35.45 kg/kmol (Cl) = (Equivalent amount of Cu 53.78 kg/h) | 60.54 kg/h $Cu_2O$ |

In order for the internal total copper balances of the chloride precipitation system to remain at the same levels the whole time, copper sulphate $CuSO_4$ (100%) has to be added to the process according to the following calculation:

| | |
|---|---|
| Amount of Cu removed from the process as copper chloride | 25.2 kg/h |
| Amount of Cu removed as metallic copper | 9.9 kg/h |
| Amount of Cu entering in zinc sulphate solution | 4.3 kg/h |
| Amount of Cu to be added to chloride removal (equivalent amount of $CuSO_4$(100%) 77.4 kg/h), 31.2 kg/h of which is precipitated in $Cu_2O$ form and 3.1 kg/h in metallic form upon the addition of zinc powder. | 30.8 kg/h |

The invention claimed is:

1. A method for removing chloride from concentrated zinc sulphate solution with copper(I) oxide, whereby a sidestream is taken from the zinc sulphate solution, which is cooled and routed to a chloride removal stage, wherein chloride removal is performed with copper(I) oxide, which is produced in a separate copper(I) oxide formation stage by reducing the copper sulphate contained in the zinc sulphate solution fed into the copper(I) oxide formation stage and the copper sulphate additionally fed into the copper(I) oxide formation stage into copper(I) oxide with zinc powder, said reducing the copper sulphate being conducted at a pH in the range of 4.5-5.

2. A method according to claim 1, wherein the solution exiting the chloride removal stage is subjected to liquid/solids separation and that the copper chloride residue formed is routed to hydroxide washing in order to form sodium chloride solution and a precipitate containing copper(I) oxide and metallic copper.

3. A method according to claim 2, wherein the precipitate exiting hydroxide washing is leached in a copper leaching stage with sulphuric acid and oxygen-containing gas and that the acidic copper sulphate solution that is formed is routed either wholly or partly to the chloride removal stage.

4. A method according to claim 3, wherein part of the copper sulphate solution formed in the copper leaching stage is routed to the copper(I) oxide formation stage.

5. A method according to claim 2, wherein part of the precipitate exiting hydroxide washing is routed to the copper(I) oxide formation stage.

6. A method according to claim 1, wherein the pH of the copper(I) oxide formation stage is regulated with sodium hydroxide.

* * * * *